Patented Feb. 26, 1946

2,395,452

UNITED STATES PATENT OFFICE 2,395,452

ESTERS OF HYDROXYDIHYDRONORPOLY-CYCLOPENTADIENES

Herman A. Bruson, Philadelphia, Pa., assignor to The Resinous Products & Chemical Company, Philadelphia, Pa., a corporation of Delaware No Drawing. Application February 20, 1943, Serial No. 476,639

17 Claims. (Cl. 260—497)

This invention relates to carboxylic esters of hydroxy-dihydronor-polycyclopentadienes and to a method for the preparation of these compounds by the addition-rearrangement reaction of organic carboxylic acids and polycyclopentadienes in a distinctly acidic environment.

It has been reported that when dicyclopentadiene is boiled with crotonic acid, depolymerization of the dicyclopentadiene occurs to form cyclopentadiene which adds to the double bond of the crotonic acid, in accordance with the Diels-Alder reaction, to form a bicyclic carboxylic acid (Komppa and Beckmann, Liebig's Annalen der Chemie, 523, 78 (1936)), thus

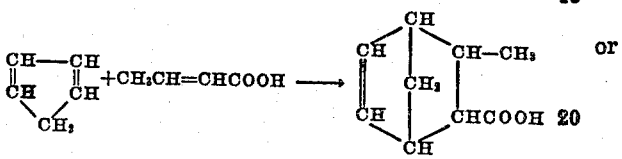

It is also known that when dihydro-dicyclopentadiene is oxidized with selenium dioxide in acetic anhydride solution, an ester of a dicyclopentenyl alcohol is obtained (Alder and Stein, Liebig's Annalen der Chemie, 504, 210 (1933); Pirsch, Berichte der Deutschen Chem. Gesellschaft, 67, 1117 (1934))

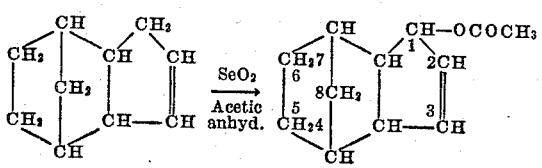

It contains the acyl radical in the cyclopenteno ring which also contains the double bond. Upon saponification this ester yields a solid alcohol melting at 30° C.

It has now been found that when organic carboxylic acids and polycyclopentadienes are mixed in an environment which is distinctly acidic and, therefore, sufficiently catalytic in nature, there occurs a reaction between the two main components which involves both addition of acid to the ring system and a rearrangement of the ring system to a new type of product which, since it resembles the structure of the parent polycyclopentadiene, is here termed the norpolycyclopentadiene system. For example, acetic acid combines under the influence of an acidic catalyst with dicyclopentadiene to form an acetate of the corresponding hydroxydihydro-nordicyclopentadiene,

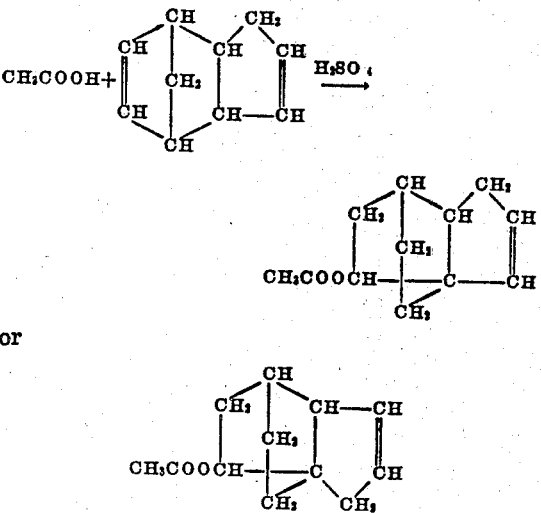

The first product formula is the more probable of the two possible formulae, the structure of which has been fully established in respects other than the relationship of ester grouping to the methylene of the cyclopenteno ring.

The compounds of this invention are addition-rearrangement products from a carboxylic acid and a polycyclopentadiene. They are esters of hydroxydihydronorpolycyclopentadiene and a carboxylic acid. The general formula of such an ester may be represented

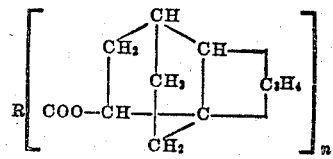

wherein $C_3H_4$ is a propenylene group which in conjunction with the adjoining carbon atoms forms a cyclopenteno group, R is the residue of a carboxylic acid, and $n$ is a small integer.

Upon saponification the above acetate yields hydroxydihydronor-dicyclopentadiene, which is an alcohol that is liquid at 0° C.

The new esters contain one double bond in the five-membered ring opposite the cycle holding the ester grouping. It is rather surprising that only one double bond of the two present in the original polycyclopentadiene adds the organic carboxylic acid even when a large excess of the latter is employed.

As a polycyclopentadiene, there may be used any of these polymeric compounds containing two double bonds per molecule, such as dicyclopentadiene, tricyclopentadiene, tetracyclopentadiene, pentacyclopentadiene, and homologues thereof. Some of these exist in isomeric forms which are likewise operative. There may also be used mixtures of homologues and/or isomers. A mixture of higher members of the polycyclopentadienes with dicyclopentadiene is a particularly useful mixture, since the dicyclopentadiene acts as a flux as well as a reactant. The various polymers may be obtained as crystalline solids by heating cyclopentadiene at 150° C. to 200° C. in a closed vessel.

They possess the following general formula:

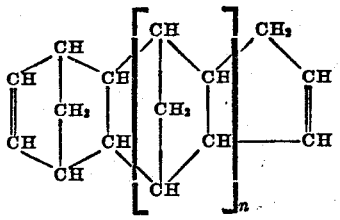

where $n$ is a number varying from zero to a small integer such as 1, 2, or 3.

As an organic carboxylic acid there may be used an aliphatic, arylaliphatic, cycloaliphatic, heterocyclic, or aromatic carboxylic acid. The acid may be monocarboxylic or polycarboxylic in which latter case mono-esters or poly-esters thereof may be formed with one or more of the carboxylic groups of the acid. The acid may be straight-chained, branched-chained, acylic, cyclic, saturated, or unsaturated. The acid may be relatively strong or weak, although in the latter case proper choice of catalyst is generally necessary to hasten the reaction and to provide a practical yield in a reasonable time, as will be further explained below. Acids which may be reacted with the polycyclopentadienes having two double bonds per molecule in a distinctly acidic environment are typified by the following acids: Formic, acetic, propionic, butyric, isobutyric, valeric, isovaleric, caproic, caprylic, capric, lauric, myristic, palmitic, stearic, lactic, glycollic, α-hydroxy-isobutyric, acrylic, methacrylic, phenylacrylic, crotonic, cinnamic, chloroacetic, bromoacetic, dichloroacetic, trichloroacetic, thiocyanoacetic, α- or β-chloropropionic, chlorocrotonic, methoxyacetic, ethoxyacetic, butoxyacetic, butoxypropionic, phenoxyacetic, undecylenic, oleic, linoleic, levulinic, oxalic, succinic, pimelic, adipic, sebacic, benzoic, salicylic, phthalic, naphthenic, furoic, abietic, naphthoic, tricarballylic, citric, tartaric, chloromaleic, chlorosuccinic, γ-acetyl γ-methyl pimelic.

When the organic carboxylic acid has a dissociation constant of about $1.5 \times 10^{-3}$ or more, the acid itself imparts sufficient acidity to the reaction mixture to promote the reaction between polycyclopentadiene and acid. The reaction may be said to be self-catalyzed. At the same time the reaction of these relatively stronger carboxylic acids is further accelerated by the presence of a mineral acid, such as sulfuric or hydrochloric acid, or a catalyst such as zinc chloride, aluminum chloride, boron trifluoride, or similar acidic condensing agent. As the ionization constant of the acid becomes less than about $1.5 \times 10^{-3}$, the use of an acidic catalyst becomes more and more important in order to obtain a practical rate of reaction and a good yield. The choice of optimum catalyst depends upon the particular acid used. Such catalysts as sulfuric acid, alkyl sulfonic acids such as butyl sulfonic acid or aryl sulfonic acids such as benzene or naphthalene sulfonic acid are effective with carboxylic acids having ionization constants as low as $1.3 \times 10^{-5}$. For acids below this value, the reaction must be catalyzed with the most active type of promoter, such as boron trifluoride, as such, or in the form of one of its coordination complexes of an oxygenated organic compound or water. As is known, boron trifluoride forms complexes with acids, such as $BF_3.2RCOOH$, aldehydes, such as $BF_3.2CH_3CHO$, ketones, such as $BF_3.CH_3COCH_3$, ethers, such as $BF_3.C_2H_5OC_2H_5$, esters, such as $BF_3.2CH_3COOCH_3$, or $BF_3.(H_2O)_x$, etc. These are extremely effective in promoting the desired reaction which includes addition and rearrangement.

The boron fluoride group of catalysts is one of great importance. Boron trifluoride by itself or from its coordination complexes activates weak acids to such an extent that they readily combine with the polycyclopentadienes. This is in agreement with the known behavior of boron trifluoride and other acidic catalysts in forming "ansolvo" acids or complexes with weak acids which then act like strong acids. By this means weak organic acids such as octoic, lauric, oleic, stearic, abietic, tetrahydroabietic, hexahydrobenzoic, and other higher aliphatic, arylaliphatic, or cycloaliphatic carboxylic acids are readily reacted with a polycyclopentadiene. At the same time boron trifluoride as a catalyst is not without benefit in the case of reactions involving relatively stronger carboxylic acids.

The addition of an organic carboxylic acid to di-, tri-, tetra-, or penta-cyclopentadiene takes place preferably at temperatures from about 50° C. to 145° C. although reaction often starts even below room temperature. Since dicyclopentadiene begins to crack into cyclopentadiene above 150° C., it is desirable that this temperature be not exceeded in the case of this reactant in order to obtain the best yields. In the case of tricyclopentadiene and the higher polycyclopentadienes, the depolymerization temperatures lie above 170° C. and, in the case of these compounds, temperatures up to about 200° C. can be employed, if necessary. In cases where it is advantageous to employ an inert solvent in order to obtain a homogeneous reaction mixture, ethylene dichloride or tetrachlorethane is suitable. The high melting polycyclopentadienes, notably the tetra- and the penta-cyclopentadiene, are advantageously dissolved in dicyclopentadiene so as to form a low-melting or liquid eutectic and are thus rendered amenable to esterification.

Tricyclopentadiene adds the organic carboxylic acids according to the present invention as follows (using acetic acid as an example).

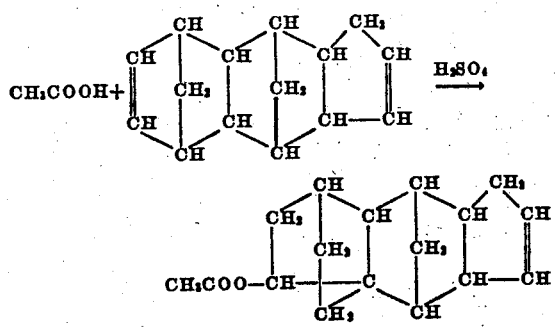

Upon saponification the above acetate yields a crystalline alcohol

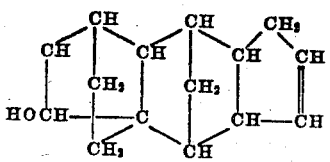

melting at 115° C.

In a similar manner, tetracyclopentadiene and pentacyclopentadiene yield the corresponding dihydronor- polycyclopentadienyl esters.

The following examples illustrate this invention, it being understood that the conditions and proportions can be varied over a considerable range without departing from the spirit of the invention as defined by the appended claims.

The esters obtained are all new substances. They are useful as solvents, as plasticizers and softening agents for synthetic resins, synthetic or natural rubber, as hydraulic fluids, as components for printing inks, nitrocellulose compositions, and as intermediates for insecticides, textile finishing agents, waxes, resins, wetting agents, and other industrial applications. The residual double bond present in their molecule is still capable of adding hydrogen, halogen, and thiocyanogen to yield well-defined addition products.

The following examples illustrate this invention. Parts are by weight.

*Example 1*

A mixture of 132 parts of dicyclopentadiene, 106 parts of 87% formic acid and 10 parts of 40% sulfuric acid was stirred rapidly for 5 hours at 60–70° C. The product was washed with water, taken up in toluene, and the toluene layer washed successively with dilute soda solution and water. After the toluene was evaporated, the residual oil was distilled under reduced pressure to yield 126 parts of dihydronordicyclopentadienyl formate as a colorless oil, boiling at 111–112° C./10 mm., having a pleasant odor, and possessing the probable formula

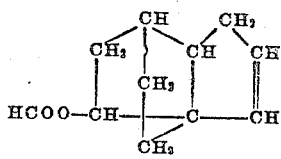

*Example 2*

A mixture consisting of 250 parts of glacial acetic acid, 4 parts of 98% sulfuric acid, 6 parts of water, and 100 parts of dicyclopentadiene was stirred and heated at 60–70° C. for 4½ hours under a reflux condenser. The dark solution obtained was cooled and poured into 1000 parts of water. An oil layer separated and some ethylene dichloride was added to assist in stratification. The lower oil layer was drawn off, washed several times with water, with dilute soda solution, and finally again with water. The solvent solution was dried, the solvent stripped off, and the oil distilled under reduced pressure.

The acetic ester of hydroxydihydronordicyclopentadiene distilled between 95° and 100° C. at 1 mm. absolute pressure of mercury as a colorless liquid having a pleasant melon-like odor. Upon redistillation at 10 mm. it boiled at 119°–121° C.

The yield was 125 parts. The following constants were determined for the product:

$N_D^{25}$ 1.4935, iodine No. 134 (theory 132)
$d_4^{25}$ 1.0714, saponification No. 290 (theory 292)

Upon saponification with alcoholic potassium hydroxide solution, dihydronordicyclopentadienyl acetate yielded hydroxydihydronordicyclopentadiene, having the following properties: boiling point 116°/10 mm., $N_D^{25}$ 1.5249 and $d_4^{25}$ 1.0773. This alcohol is a colorless oil of faint camphoraceous odor.

*Example 3*

A mixture consisting of 132 parts of dicyclopentadiene, 400 parts of propionic acid, 5.3 parts of 98% sulfuric acid, and 8 parts of water was heated at 60–70° C. for five hours. The product was cooled, then poured into 1000 parts of water. Toluene was added thereto and an oil layer separated.

The toluene extract was washed several times with cold water, then with dilute (1%) soda solution, and finally with water. Upon evaporation of the toluene, 169 parts of residual oil was obtained. This was distilled under reduced pressure. The dihydronordicyclopentadienyl propionate thus obtained came over at 100–110° C./1–2 mm. as a colorless oil having a melon-like odor in a yield of 137 parts. Upon redistillation at 10 mm. it boiled at 131–133° C. and possessed the following constants:

$N_D^{25}$ 1.4901
$d_4^{25}$ 1.0501

Upon saponification by boiling with an excess of aqueous 10% sodium hydroxide solution for five hours hydroxydihydronordicyclopentadiene identical with that described in Example 2 was obtained.

*Example 4*

A mixture of 132 parts of dicyclopentadiene and 132 parts of chloroacetic acid was stirred and heated for 12 hours at 95° C. The product was then distilled under reduced pressure. After the unchanged dicyclopentadiene and chloroacetic acid had distilled off, the desired ester, the chloroacetate of hydroxydihydronordicyclopentadiene, came over at 125–130° C./1 mm. as a colorless oil. Upon redistillation it boiled at 154–156° C./10 mm. and possessed the following constants:

$N_D^{25}$ 1.5111
$d_4^{25}$ 1.1916

The yield was 90 parts. While the above ester was prepared without addition of a separate acid as a catalyst, by the use of five parts of 40% sulfuric acid or two parts of benzene sulfonic acid as a catalyst the time of condensation may be cut to five hours and the yield materially increased.

Equivalent weights of bromoacetic acid, dichloro- or dibromo-acetic acid, or trichloroacetic acid may be used in the place of the chloroacetic acid and good yields of the corresponding esters obtained without addition of another acid. Thus, acids as strong as chloroacetic acid or stronger can act as their own catalyst, since they supply a distinctly acidic environment.

*Example 5*

A mixture of 66 parts of dicyclopentadiene, 174 parts of levulinic acid, and 5 parts of 40% sulfuric acid was stirred for 8 hours at 60–65°

C. The mixture was then cooled and mixed with an equal volume of ethylene dichloride. The solvent layer was separated and washed thoroughly with water, wtih soda solution, and finally again with water. The ethylene dichloride was removed by evaporation under reduced pressure and the residual oil weighing 101 parts was distilled in vacuo at 1 mm. Dihydronordicyclopentadienyl levulinate came over as a pale yellow oil at 158–160° C./1 mm. in a yield of 83 parts. Upon redistillation at 10 mm. it boiled at 190° C. and possessed the following constants:

$N_D^{25}$ 1.4977
$d_4^{25}$ 1.0973

*Example 6*

A mixture of 141 parts of tricyclopentadiene, 300 parts of glacial acetic acid, 4 parts of 98% sulfuric acid and 6 parts of water was rapidly stirred and heated at 65–70° C. for six hours. The mixture was cooled, washed with water, taken up in toluene and the toluene solution washed successively with dilute soda solution and water. The toluene was distilled off under reduced pressure to yield 168 parts of crude dihydronortricyclopentadienyl acetate, which upon fractionation in vacuo at 1 mm. distilled at 150–155° C. as a pale yellow oil. Upon redistillation at 11 mm. it came over at 190–194° C. as a colorless, somewhat viscid liquid. Upon saponification it yielded the corresponding dihydronortricyclopentadienyl alcohol as a colorless viscous oil of a boiling point 180–185° C./11 mm., which gradually solidifies to a waxy mass, melting at 115°–116° C. after recrystallization from nitromethane.

*Example 7*

500 parts of dicyclopentadiene was heated for 12 hours at 190–200° C. and the wax-like mixture of tri-, tetra-, penta- and higher polycyclopentadienes obtained was stirred for 12 hours at 90–100° C. with 2500 parts of glacial acetic acid containing 100 parts of 40% sulfuric acid. The product was filtered hot and the filtrate evaporated under reduced pressure until most of the unchanged acetic acid had been removed. The residue was washed thoroughly with water and soda solution, dried, and evaporated to dryness under reduced pressure at 90–95° C. The viscous product obtained consisted essentially of a mixture of dihydronortricyclopentadienyl acetate, dihydronortetracyclopentadienyl acetate, and dihydronorpentacyclopentadienyl acetate, having the probable formula

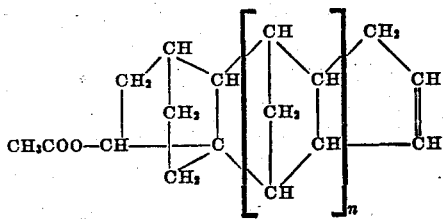

$n = 1$, 2, and 3.

*Example 8*

A mixture of 132 parts of dicyclopentadiene, 358 parts of caproic acid, 10 parts of 98% sulfuric acid was stirred and heated at 90°–115° C. for eight hours. The mixture was allowed to stand overnight, washed with water, with dilute sodium hydroxide solution several times, and again with water, dried, and distilled under reduced pressure. The dihydronordicyclopentadienyl caproate distilled as a pale yellow liquid between 169° C. and 173° C. at 10 mm. and boiled at 120°–130° C./2 mm. The product had a saponification number of 217, compared with a theoretical number of 226.

*Example 9*

A mixture consisting of 132 parts of dicyclopentadiene, 172 parts of crotonic acid, 10 parts of naphthalene sulfonic acid and 10 parts of 40% sulfuric acid was heated under reflux at 95°–105° C. for five hours with constant stirring. The product was cooled, washed with water, with soda solution, and finally with water, then dried and distilled under reduced pressure.

The dihydronordicyclopentadienyl crotonate having the formula

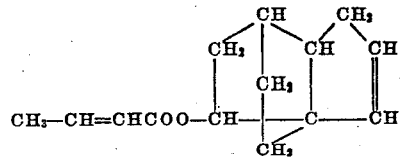

distills over as a pale yellow oil at 128°–130° C./3 mm.

*Example 10*

A mixture of 132 parts of dicyclopentadiene, 104 parts of alpha-hydroxyisobutyric acid and 10 parts of aqueous 40% sulfuric acid was stirred and heated at 95°–98° C. for six hours. The product was cooled, washed with water, taken up in an equal volume of toluene, washed with dilute soda solution, and finally with water, and dried. The toluene was evaporated off and the residual oil (192 parts) was distilled under reduced pressure. The fraction boiling at 135–142° C./2 mm. was a colorless liquid, dihydronordicyclopentadienyl alpha-hydroxyisobutyrate. The yield was 104 parts. Upon redistillation this ester boiled at 155°–157° C./10 mm.

*Example 11*

To 212 parts of 85% lactic acid, 20 parts of 98% sulfuric acid was added gradually with cooling. Dicyclopentadiene (132 parts) was then added. The mixture was stirred and gradually heated under a reflux condenser on a steam bath. An exothermal reaction occurred which raised the temperature to about 113° C. When this reaction had subsided, the mixture was stirred continuously and heated for 3 hours at 95° C. It was then cooled, washed with water, and an oil layer separated. The oil was taken up in toluene and the toluene solution shaken with powdered calcium hydroxide to destroy residual acidity. The filtered solution was then distilled under reduced pressure.

The lactate of hydroxydihydronordicyclopentadiene distills as a colorless liquid boiling at 150–155° C./8 mm.

*Example 12*

A mixture of 66 parts of dicyclopentadiene, 22.5 parts of anhydrous oxalic acid, and 75 parts of tetrachloroethane was stirred and heated under reflux at 135°–140° C. for five hours. The product was cooled, then washed with water and dilute soda solution until free from acidity, and finally washed again with water. The dried liquid was evaporated under reduced pressure to remove the tetrachloroethane. The residual dark, viscous product consisted essentially of the crude diester, the oxalate of hydroxydihydronordicyclopentadiene, in a yield of 75 parts. It boiled above 230° C./1 mm. When this oil was boiled with a solution of 85 parts of sodium hydroxide in 250 parts of alcohol and 100 parts of water for 8 hours, hydroxydihydronordicyclopentadiene was obtained in 90% yield.

*Example 13*

A mixture of 138 parts of salicylic acid, 198 parts of dicyclopentadiene, and 20 parts of 40% sulfuric acid was stirred rapidly and heated on a steam bath at 95°–100° C. for eleven hours. The product was cooled, mixed with an equal volume of toluene and filtered. The filtrate was washed thoroughly with water and neutralized with an excess of powdered calcium hydroxide. This mixture was then filtered and the filtrate was distilled under reduced pressure. The salicylate of hydroxydihyronordicyclopentadiene having the formula

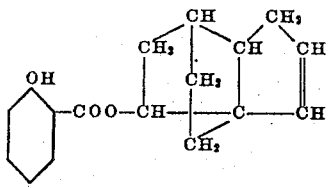

distilled over at 174°–176° C./3 mm. as a colorless oil. The yield was 138 parts. On standing the product solidified, and upon recrystallization from methanol formed colorless crystals, melting at 93°–94° C.

*Example 14*

To a stirred mixture of 144 parts of alpha-ethyl hexoic acid and 132 parts of dicyclopentadiene 30 parts of boron trifluoride-diethyl ether complex ($BF_3 \cdot C_2H_5$—O—$C_2H_5$) was added. An exothermal reaction set in during which the temperature of the mixture reached 60° C. After the rapid evolution of heat had subsided, the mixture was gradually heated to 90° C. during the course of one and one-half hours, and then held at 90° C. for two hours longer while it was stirred constantly. The resulting product was cooled, washed twice with water, then with sodium carbonate solution, and finally again with water. It was then dried and distilled in vacuo. The final product thus obtained corresponded in composition to the ethyl hexoate of hydroxydihydronordicyclopentadiene. It distilled at 150°–152° C./2 mm. as a colorless oil in a yield of 110 parts.

*Example 15*

(a) To a stirred mixture of 200 parts of lauric acid and 132 parts of dicyclopentadiene 30 parts of boron trifluoride-diethyl ether complex was added. The mixture was then heated at 80°–85° C. for five hours, and worked up as in Example 1. The product obtained was the lauric acid ester of hydroxydihydronordicyclopentadiene which distilled at 195°–200° C./2 mm. as a colorless oil in a yield of 145 parts. It possessed the following constants:

$N_D^{25}$ 1.4797; $d_4^{25}$ 0.955; Sap. No. 167 (theory 169)

(b) The reaction of lauric acid and dicyclopentadiene was repeated with the use of 15 parts of boron trifluoride gas in the place of the ether complex. The same product was obtained in about the same yield.

*Example 16*

A mixture of 142 parts of stearic acid, 66 parts of dicyclopentadiene and 10 parts of boron trifluoride-diethyl ether complex was stirred at 70° C. for seven hours, then cooled, washed and worked up as in Example 1. The resulting product, the stearic acid ester of hydroxydihydronordicyclopentadiene, distilled at 230°–240° C./3 mm. as a pale yellow oil. The yield was 100 parts. Upon redistillation it boiled at 240°–243° C./2 mm. and possessed the following constants:

$N_D^{25}$ 1.4792; $d_4^{25}$ 0.937; Sap. No. 140 (theory 135)

*Example 17*

A mixture of 141 parts of oleic acid, 66 parts of dicyclopentadiene and 10 parts of boron trifluoride-diethyl ether complex was stirred at 55° C. for six hours. The mixture was washed, neutralized and worked as in Example 1. The resulting product, the oleic acid ester of hydroxydihydronordicyclopentadiene, distilled at 240°–250° C./2 mm. as a pale yellow oil in a yield of 115 parts.

*Example 18*

A mixture of 110 parts of undecylenic acid, 79 parts of dicyclopentadiene and 10 parts of boron trifluoride-diethyl ether complex was stirred at 55–60° C. for five hours. The cooled mixture was washed, neutralized, and worked up as in Example 1. The resulting product, the undecylenic acid ester of hydroxydihydronordicyclopentadiene, boiled at 185°–190° C./2 mm. The yield was 85 parts.

*Example 19*

To a stirred mixture of 141 parts of linseed oil fatty acids and 66 parts of dicyclopentadiene 10 parts of boron trifluoride-diethyl ether complex was gradually added at 55° C. The mixture was stirred for six hours thereafter at 55° C., then cooled, taken up in toluene and washed with water, then with dilute soda solution and finally with water. The toluene was distilled off and the residual oil distilled in vacuo. The fraction boiling at 245–250° C./2 mm. was a light yellow oil corresponding to the esters of hydroxydihydronordicyclopentadiene and the mixed fatty acids present in linseed oil. The yield was 90 parts of pure esters.

*Example 20*

A mixture of 112 parts of furoic acid, 132 parts of dicyclopentadiene and 108 parts of boron trifluoride-diethyl ether complex was stirred at 55°–60° C. for eight hours. The product was cooled, dissolved in toluene, filtered, and the filtrate washed with water and soda solution. The dried product was distilled in vacuo. The furoic acid ester of hydroxydihydronordicyclopentadiene distilled at 165°–167° C./2 mm. as a pale yellow oil, which gradually solidified to a crystalline solid on standing. Upon recrystallization from ethanol it formed colorless crystals, M. P. 72° C.

*Example 21*

To a stirred mixture of 61 parts of benzoic acid, 125 parts of ethylene dichloride, and 66 parts of dicyclopentadiene 5 parts of boron trifluoride-diethyl ether complex was added. An exothermic reaction took place, the temperature rising to 45° C. The mixture was stirred at 45° C. for five hours, then cooled, washed with cold water, followed by a wash with sodium carbonate solution and a final water wash. The ethylene dichloride was evaporated off in vacuo, and the residual oil (140 parts) distilled in vacuo. The product, the benzoic acid ester of hydroxydihydronordicyclopentadiene distilled at 170–175° C./2 mm. as a colorless oil in a yield of 78 parts. Upon redistillation it boiled at 164° C./2 mm.

*Example 22*

A mixture of 54 parts of dicyclopentadiene, 84 parts of naphthenic acids (average molecular weight 204), and 2 parts of boron trifluoride-diethyl ether complex was stirred at 45°–50° C. for two hours. The mixture was then cooled, washed with water and soda solution, dried and distilled in vacuo. The resulting product, the naphthenic acid ester of hydroxydihydronordicyclopentadiene, distilled as a pale yellow oil at 175°–195° C./2 mm.

*Example 23*

A mixture of 148 parts of phthalic anhydride (1 mol) and 32 parts of methanol was heated under reflux for three hours, to form the monophthalic acid methyl ester. To this was added 132 parts of dicyclopentadiene and 5 parts of boron trifluoride-diethyl ether. The mixture was stirred at 90° C. for five hours, then cooled, washed with water and soda solution, dried and distilled in vacuo.

The mixed ester,

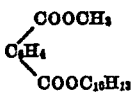

($C_{10}H_{13}$=the dihydronordicyclopentadienyl residue), distilled at 205°–215° C./2 mm. as a viscous, almost colorless oil in a yield of 180 parts. Upon redistillation it boiled at 208°–212° C./2 mm.

It is useful as a plasticizer for synthetic rubber, synthetic resins, and nitrocellulose.

In a similar manner phthalic acid monoethyl ester yields the corresponding dihydronordicyclopentadienyl ethyl phthalate. It was obtained as a colorless oil boiling at 190°–200° C./1 mm.

By using phthalic acid mono-n-butyl ester, the corresponding dihydronordicyclopentadienyl butyl phthalate was obtained as a pale yellow oil boiling at 230°–235° C./3 mm.

*Example 24*

A mixture of 59.4 parts of crystalline tricyclopentadiene having two double bonds per molecule, 35 parts of isobutyric acid, and 5 parts of boron trifluoride-diethyl ether in 50 parts of ethylene dichloride was stirred at 90°–95° C. for six hours. The mixture was then cooled, washed with water and soda solution, dried, and distilled in vacuo. The resulting product, the isobutyric acid ester of hydroxydihydronortricyclopentadiene, distilled at 175°–185° C./3 mm. as an almost colorless oil. Upon redistillation the pure compound boiled at 168°–170° C./2 mm.

*Example 25*

500 parts of dicyclopentadiene was heated for 12 hours at 190–200° C. and the wax-like mixture of di-, tri-, tetra-, penta- and higher polycyclopentadienes having two double bonds per molecule obtained was stirred at 90–95° C. for eight hours with 2500 parts of glacial acetic acid containing 40 parts of boron trifluoride. The reaction product was washed with water, taken up in toluene, then washed with soda solution and filtered, washed again with water, dried, and distilled in vacuo.

The fraction boiling at 90°–100° C./1 mm. was the acetate of hydroxydihydronordicyclopentadiene.

The acetate of hydroxydihydronortricyclopentadiene distilled at 150°–155° C./1 mm. as a pale yellow oil.

The acetate of hydroxydihydronortetracyclopentadiene distilled at 195°–205° C./1 mm. as a pale yellow oil.

The residual oil consisted essentially of the acetate of hydroxydihydronorpentacyclopentadiene and higher hydroxydihydronorpolycyclopentadienes.

*Example 26*

A mixture of 73 parts of adipic acid, 132 parts of dicyclopentadiene, 200 parts of ethylene dichloride and 7 parts of boron trifluoride diethyl ether complex was stirred at 60° C. for six hours. The reaction mixture was cooled, filtered to remove traces of adipic acid, washed several times with water and soda solution, and dried. The dried ethylene dichloride solution was evaporated to dryness in vacuo at 100° C. The residual product was a dark viscous mass weighing 150 parts consisting essentially of di-dihydronordicyclopentadienyl adipate. It could not be distilled in high vacuo without decomposition.

In the above examples, the reaction of pure or relatively pure polycyclopentadienes with carboxylic acids has been described. In place of such polycyclopentadienes there may be used crude products or mixtures of hydrocarbons containing 5% or more of polycyclopentadienes having two double bonds per molecule. Such mixtures are obtained in the thermal cracking of petroleum as, for example, in the manufacture of gasoline or in the manufacture of water gas. This new reaction of polycyclopentadienes provides a new method for separating certain components of mixtures of hydrocarbons and gives new utility to them.

This application is a continuation-in-part of my application Serial No. 443,724, filed May 20, 1942.

I claim:

1. A method for preparing carboxylic esters of hydroxydihydronorpolycyclopentadiene h a v i n g the acyl group attached through oxygen to one terminal cycle and having a double bond in the opposite terminal cycle, which comprises reacting by addition and rearrangement an organic carboxylic acid and a crystalline polycyclopentadiene having two double bonds and one to four endomethylene cycles per molecule at a temperature below the depolymerization temperature of said polycyclopentadiene in the presence of an acidic catalyst which does not act as an oxidizing agent during the reaction.

2. A method for preparing carboxylic esters of hydroxydihydronorpolycyclopentadiene h a v i n g the acyl group attached through oxygen to one terminal cycle and having a double bond in the opposite terminal cycle, which comprises reacting by addition and rearrangement an organic monocarboxylic acid and a crystalline polycyclopentadiene having two double bonds and one to four endomethylene cycles per molecule at a temperature below the depolymerization temperature of said polycyclopentadiene in the presence of an acidic catalyst which does not act as an oxidizing agent during the reaction.

3. A method for preparing carboxylic esters of hydroxydihydronorpolycyclopentadiene having the acyl group attached through oxygen to one terminal cycle and having a double bond in the opposite terminal cycle, which comprises reacting by addition and rearrangement in the presence of boron trifluoride an organic carboxylic acid and a crystalline polycyclopentadiene having two double bonds and one to four endomethylene cycles per molecule at a temperature below that at which depolymerization of said polycyclopentadiene occurs.

4. A method for preparing carboxylic esters of hydroxydihydronorpolycyclopentadiene having the acyl group attached through oxygen to one terminal cycle and having a double bond in the opposite terminal cycle, which comprises reacting by addition and rearrangement in the presence of boron trifluoride an organic monocarboxylic acid and a crystalline polycyclopentadiene having two double bonds and one to four endomethylene cycles per molecule at a temperature below that at which depolymerization of said polycyclopentadiene occurs.

5. A method for preparing carboxylic esters of hydroxydihydronorpolycyclopentadiene having the acyl group attached through oxygen to one terminal cycle and having a double bond in the opposite terminal cycle, which comprises reacting by addition and rearrangement in the presence of sulfuric acid an organic carboxylic acid having a dissociation constant of at least $1.3 \times 10^{-5}$ and a crystalline polycyclopentadiene having two double bonds and one to four endomethylene cycles per molecule at a temperature below that at which depolymerization of said polycyclopentadiene occurs.

6. A method for preparing carboxylic esters of hydroxydihydronorpolycyclopentadiene having the acyl group attached through oxygen to one terminal cycle and having a double bond in the opposite terminal cycle, which comprises reacting by addition and rearrangement a monocarboxylic acid having a dissociation constant of at least $1.5 \times 10^{-3}$ and a crystalline polycyclopentadiene having two double bonds and one to four endomethylene cycles per molecule at a temperature below that at which depolymerization of said polycyclopentadiene occurs.

7. The process of claim 6 in which the polycyclopentadiene is dicyclopentadiene.

8. A method for preparing carboxylic esters of hydroxydihydronordicyclopentadiene having the acyl group attached through oxygen to one terminal cycle and having a double bond in the opposite terminal cycle, which comprises reacting by addition and rearrangement an organic carboxylic acid and dicyclopentadiene having two double bonds per molecule at a temperature below about 150° C. and in the presence of an acidic catalyst which does not act as an oxidizing agent during the reaction.

9. A method for preparing carboxylic esters of hydroxydihydronordicyclopentadiene having the acyl group attached through oxygen to one terminal cycle and having a double bond in the opposite terminal cycle, which comprises reacting by addition and rearrangement in the presence of a boron trifluoride catalyst a monocarboxylic acid and dicyclopentadiene having two double bonds per molecule at a temperature below about 150° C.

10. A method for preparing carboxylic esters of hydroxydihydronordicyclopentadiene having the acyl group attached through oxygen to one terminal cycle and having a double bond in the opposite terminal cycle, which comprises reacting by addition and rearrangement in the presence of sulfuric acid a monocarboxylic acid having a dissociation constant of at least $1.3 \times 10^{-5}$ and a dicyclopentadiene having two double bonds per molecule at a temperature below about 150° C.

11. An acid-catalyzed, addition-rearrangement product of a carboxylic acid and a polycyclopentadiene having one to four endomethylene cycles and a double bond in each of the two terminal cycles, said product being a hydroxydihydronorpolycyclopentadiene ester of the carboxylic acid and having a double bond in a terminal five-membered cycle.

12. An acid-catalyzed, addition-rearrangement product of a monocarboxylic acid and a polycyclopentadiene having one to four endomethylene cycles and a double bond in each of the two terminal cycles, said product being a hydroxydihydronorpolycyclopentadiene ester of the monocarboxylic acid and having a double bond in a terminal five-membered cycle.

13. An acid-catalyzed, addition-rearrangement product of an aliphatic carboxylic acid and dicyclopentadiene having one endomethylene cycle and a double bond in each of its cycles, said product being a hydroxydihydronordicyclopentadiene ester of the aliphatic carboxylic acid and having a double bond in a terminal five-membered cycle.

14. An acid-catalyzed, addition-rearrangement product of acetic acid and dicyclopentadiene having one endomethylene cycle and a double bond in each of its cycles, said product being a hydroxydihydronordicyclopentadiene ester of acetic acid and having a double bond in a terminal five-membered cycle.

15. An acid-catalyzed, addition-rearrangement product of lauric acid and dicyclopentadiene having one endomethylene cycle and a double bond in each of its cycles, said product being a hydroxydihydronordicyclopentadiene ester of lauric acid and having a double bond in a terminal five-membered cycle.

16. An acid-catalyzed, addition-rearrangement product of chloroacetic acid and dicyclopentadiene having one endomethylene cycle and a double bond in each of its cycles, said product being a hydroxydihydronordicyclopentadiene ester of chloroacetic acid and having a double bond in a terminal five-membered cycle.

17. An acid-catalyzed, addition-rearrangement product of chloroacetic acid and a polycyclopentadiene containing one to four endomethylene cycles and having a double bond in each of the two terminal cycles, said product being a hydroxydihydronorpolycyclopentadiene ester of chloroacetic acid and having a double bond in a terminal five-membered cycle.

HERMAN A. BRUSON.